United States Patent

Kum

[11] 4,027,988
[45] June 7, 1977

[54] JOINT CONNECTOR FOR BARS

[76] Inventor: Dong Woo Kum, c/o George Spector, 3615 Woolworth Bldg, 233 Broadway, New York, N.Y. 10007

[22] Filed: Oct. 28, 1975

[21] Appl. No.: 626,039

[52] U.S. Cl. .............................. 403/218; 403/400; 248/431
[51] Int. Cl.² .......................................... F16B 7/04
[58] Field of Search .......... 248/431; 403/218, 219, 403/394, 400

[56] References Cited

UNITED STATES PATENTS

| 2,759,780 | 8/1956 | Barker, Jr. ................. 248/431 UX |
| 2,942,899 | 6/1960 | Rifken ............................. 463/391 |
| 3,242,887 | 3/1966 | Haydock ..................... 248/431 X |
| 3,512,813 | 5/1970 | Brimberg ........................... 403/218 |

FOREIGN PATENTS OR APPLICATIONS

| 408,381 | 9/1966 | Switzerland ...................... 403/400 |
| 1,024,915 | 1/1953 | France ............................... 403/218 |

*Primary Examiner*—Andrew V. Kundrat

[57] ABSTRACT

A joint for firmly holding three legs together along a longitudinally intermediate portions thereof; the joint consisting of two spider-like members each of which is generally hemispherical in shape and includes three radial arms and three notches therebetween for receiving the three legs, the two spider-like members being clamped together by a single central screw, and clamping the three legs therebetween, each notch and the inner side of each arm being shaped so that a leg rests therein at an angle.

3 Claims, 7 Drawing Figures

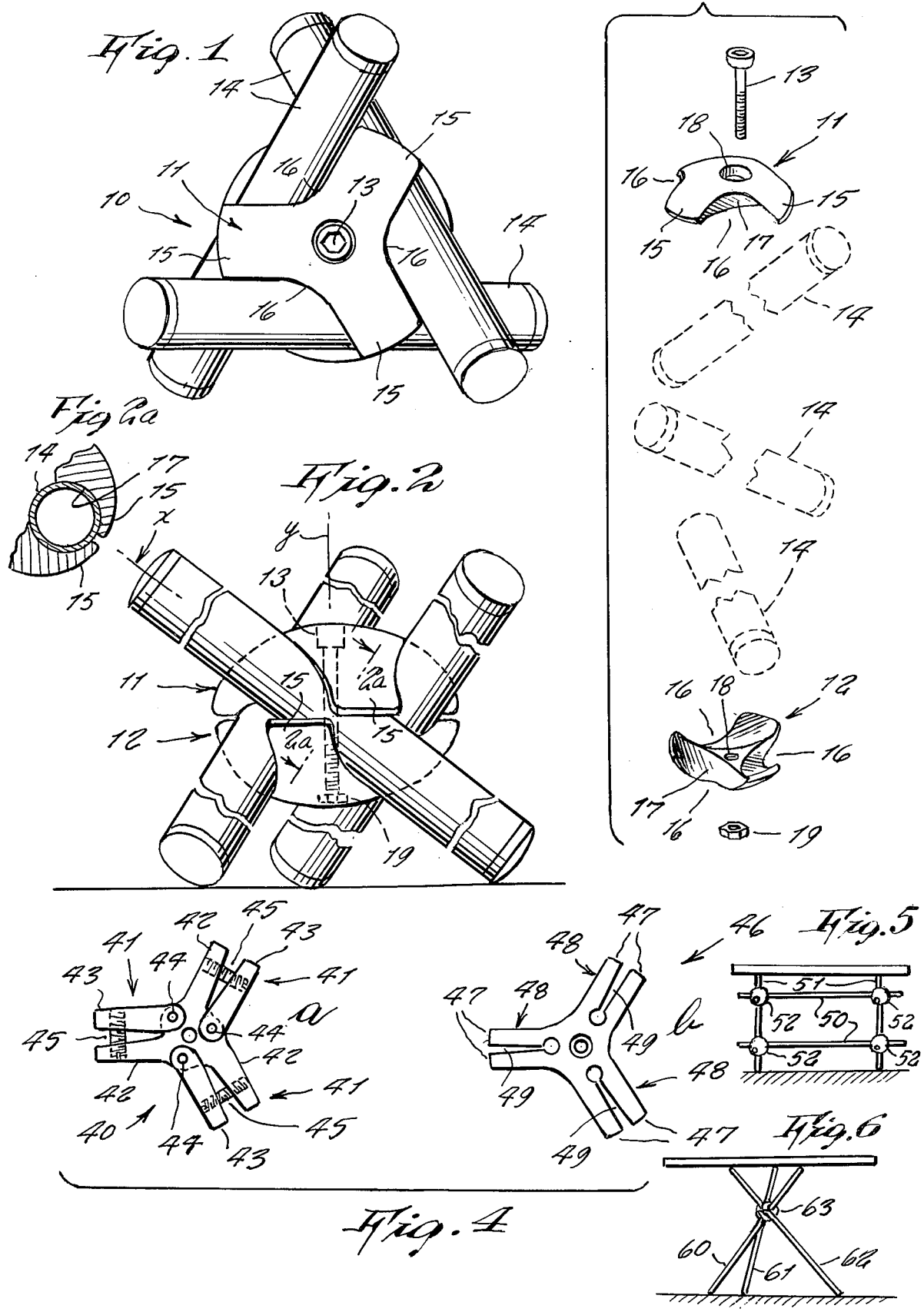

JOINT CONNECTOR FOR BARS

This invention relates generally to connecting joints for crossing bars or rods.

A principal object of the present invention is to provide a joint connector for firmly locking together three crossing legs or bars by grasping them along their longitudinally intermediate portions, and wherein the joint consists of only two spider-like jaw members held by a single screw so that the construction can be easily and quickly assembled or dis-assembled.

Another object is to provide a joint connector for three bars which would be particularly ideal for forming a tripod so to support any object thereupon such as a table top or the like.

Still a further object is to provide a joint connector wherein the securing screw does not pass through any of the bars so to necessitate holes therethrough, and which allows adjustment of the rods individually before firmly locking them in assembled position.

Other objects are to provide a joint connector for three bars which is simple in design, inexpensive to manufacture, rugged in contruction, easy to use and efficient in operation.

These and other objects will be readily evident upon a study of the following specification and the accompanying drawing wherein:

FIG. 1 is a top view of the invention, it being understood that the rods may be made of any length, as more clearly indicated in FIG. 2.

FIG. 2 is a side view of the device.

FIG. 2a is a cross sectional view on line 2a—2a of FIG. 2. FIG. 3 is an exploded perspective view thereof. FIG. 4 is a top view of modified designs of lower and upper connectors wherein the connector at a is adjustable so the connector arms are individually adjustable in width so that the rods can extend either inclined more vertically or horizontally, and wherein at b the connector arms are slightly squeezable together in width so that the rods can thus pivot a limited distance under force and would accordingly be adaptable for specific purposes.

FIG. 5 is a side view of a four-ligged table constructed with eight of the novel joints.

FIG. 6 is a tripod type table constructed with a single one of the novel joints.

Referring now to the drawing in detail, and more particularly to FIGS. 1 to 3 thereof at this time, the reference numeral 10 represents a joint connector according to the present invention wherein there are a pair of spider-like jaws 11 and 12 which are attachable together by a single screw 13 so to firmly hold three bars 14 therebetween.

Each jaw is of generally hemispherical shape and includes three radially extending curvate arms 15 with notches 16 there-between. The surface 17 of each notch extends underneath or on an inner side of one of the arms, the surface being semi-cylindrical when viewed at one end of an axis X that extends angularly respective to a transverse axis y of the screw that holds the jaws together. The axis of the notches are at right angles to each other although other angles may be provided.

A countersunk opening 18 through each jaw receives the felester-headed screw and a nut 19 that engages the threaded end of the screw.

It is now apparent that the joint holds the three bars firmly in a cluster with the screw engaging only the jaws themselves.

In FIG. 4, a design a of jaw 40 includes arms 41 each one of which is adjustable in width so that the angle of inclination of axis x can be increased or descreased respective to axis y. Each arm includes fix arm 42 integral with the main body of the jaw, and a pivotable arm 43 pivotable about pin 44; the pivotal travel being controlled by turnbuckle screw 45.

The design at b comprises the jaw 46 being made of one piece similar to jaws 11 and 12 and which is made of a slightly resilient material so that bifurcation tongues 47 of each arm 48 can flex slightly together under pressure, whereby the inclined angle of the bars can thus be changed a limited distance. Thus the tongues restrict the slot width resiliently therebetween at such times. This design would be useful in structurers where such flexibility is desirable.

FIG. 5 depicts the construction of a rectangular table wherein the horizontal rods 50 are connected by joint connectors 52 similar to the unit 10 depicted in FIG. 1 with the notches 16 and 17 oriented in horizontal and vertical directions.

FIG. 6 depicts a table with three legs 60, 61 and 62, connected by joint 63 identical to the joint shown in FIG. 1.

While various changes may be made in the detail construction, it is understood that such changes will be in the spirit and scope of the present invention as is defined by the appended claims.

What is claimed is:

1. In a joint connection, the combination of a pair of jaws, a screw fitted with nut for holding said jaws fixedly together, and a plurality of three bars for being retained between said jaws, said bars crossing each other angularly respective to each other at said joint and being each angular respective to an axis of said screw, wherein said jaws each comprise a spider-like member including three symmetrically extending arms with a cylindrical notch on an inner side of each said arm, and with each arm being segmented for adjustability, a surface of each said notch extending angularly under an adjacent one of said arms, said surface being semicylindrical when viewed from one axial end thereof, said jaws each having a spherical outer surface.

2. The combination as set forth in claim 1 wherein each said arm of each said jaw is adjustable in width by including a pivotable arm adjacent a side of said arm and being adjustably retained respective thereto by a turnbuckle screw transversely through said arm and said pivotable arm.

3. The combination as set forth in claim 1 wherein each said arm of each said jaw is bifurcated by a radially extending slot therethrough extending from an outer peripheral edge to a part way toward a center of said jaw.

* * * * *